Sept. 29, 1936.  T. CREECH  2,056,134
BREAD SLICING MACHINE
Filed Nov. 5, 1931  6 Sheets-Sheet 1
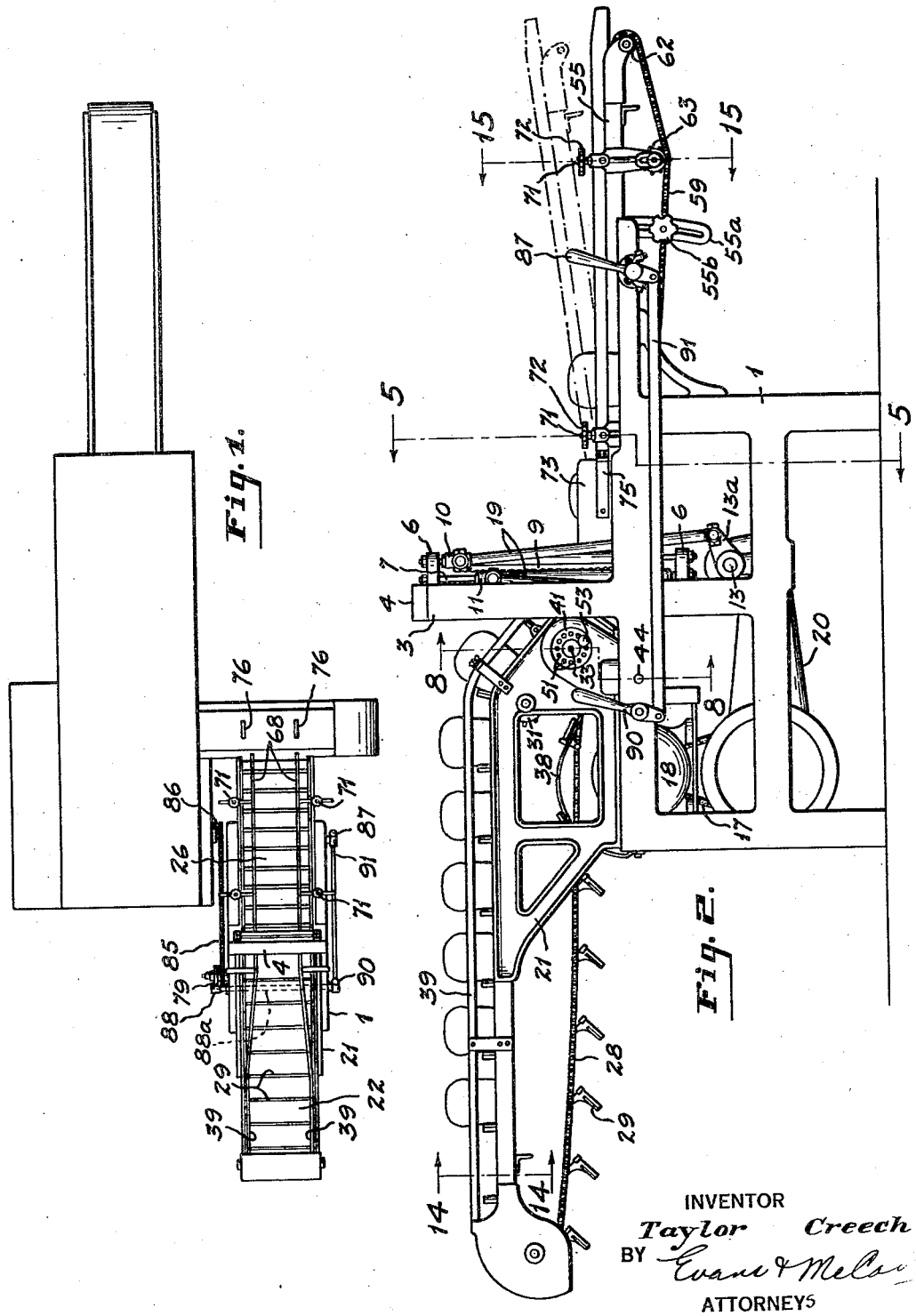
INVENTOR
*Taylor Creech*
BY
ATTORNEYS INVENTOR
Taylor Creech
BY
ATTORNEYS Sept. 29, 1936.   T. CREECH   2,056,134
BREAD SLICING MACHINE
Filed Nov. 5, 1931   6 Sheets-Sheet 3

INVENTOR
Taylor Creech
BY Evans & Meloy
ATTORNEYS

Sept. 29, 1936.　　　　T. CREECH　　　　2,056,134
BREAD SLICING MACHINE
Filed Nov. 5, 1931　　　6 Sheets-Sheet 4

INVENTOR
Taylor Creech
BY Evans & McCoy
ATTORNEYS

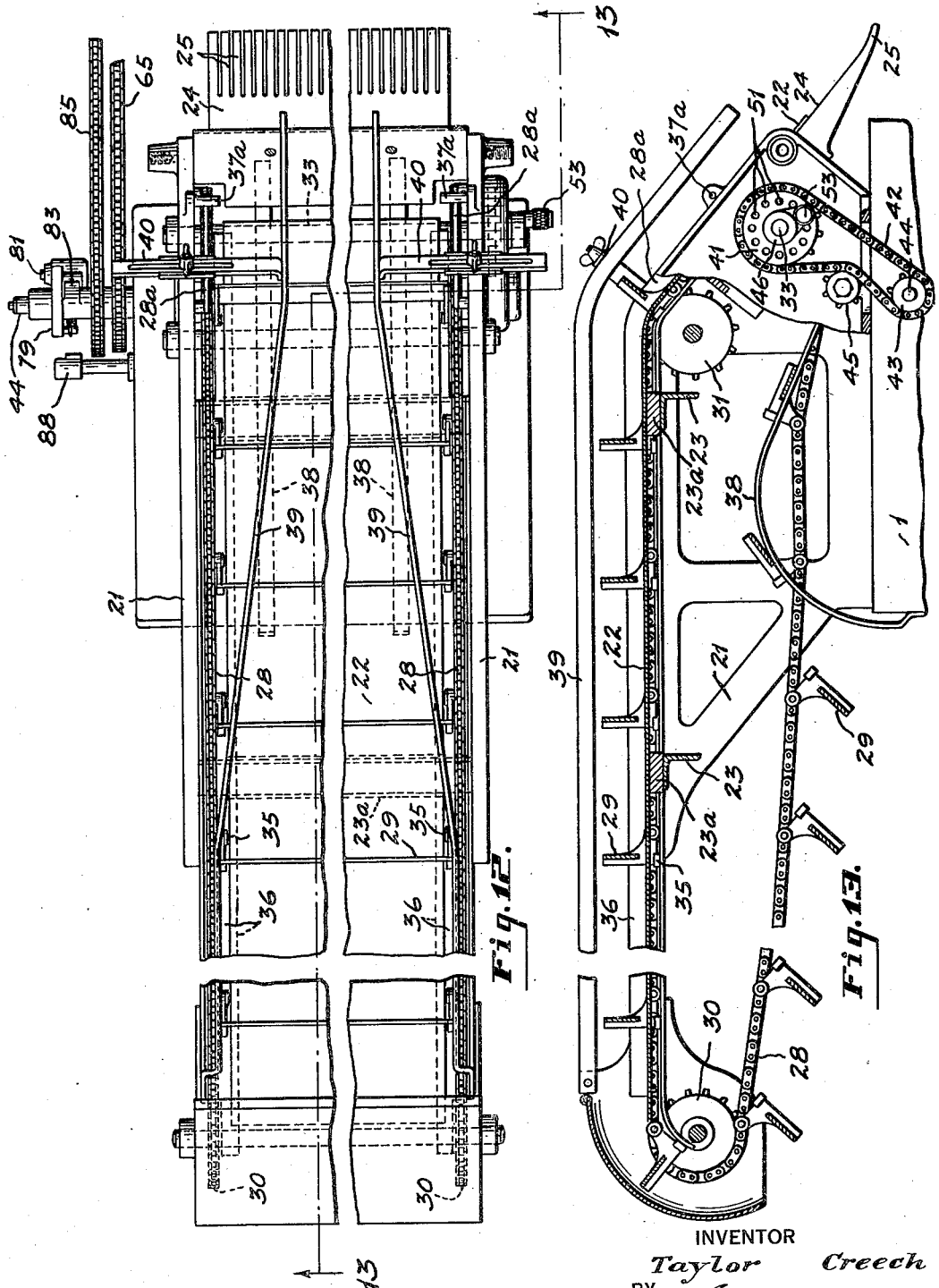

Sept. 29, 1936.           T. CREECH           2,056,134
                       BREAD SLICING MACHINE
                        Filed Nov. 5, 1931         6 Sheets-Sheet 6
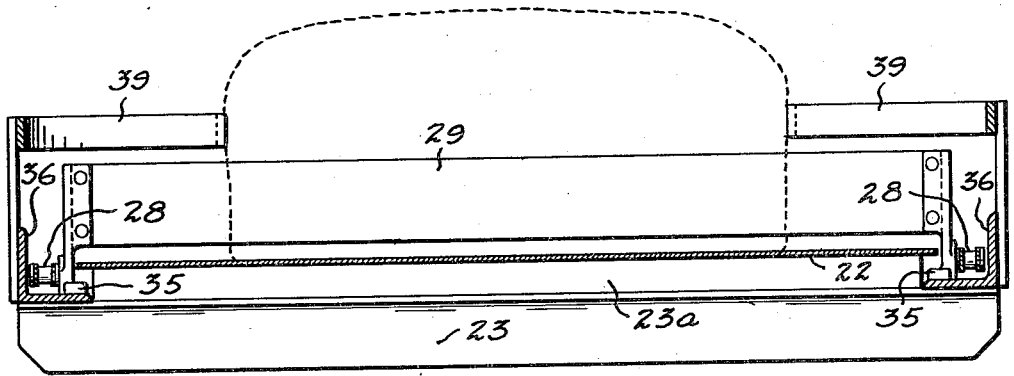
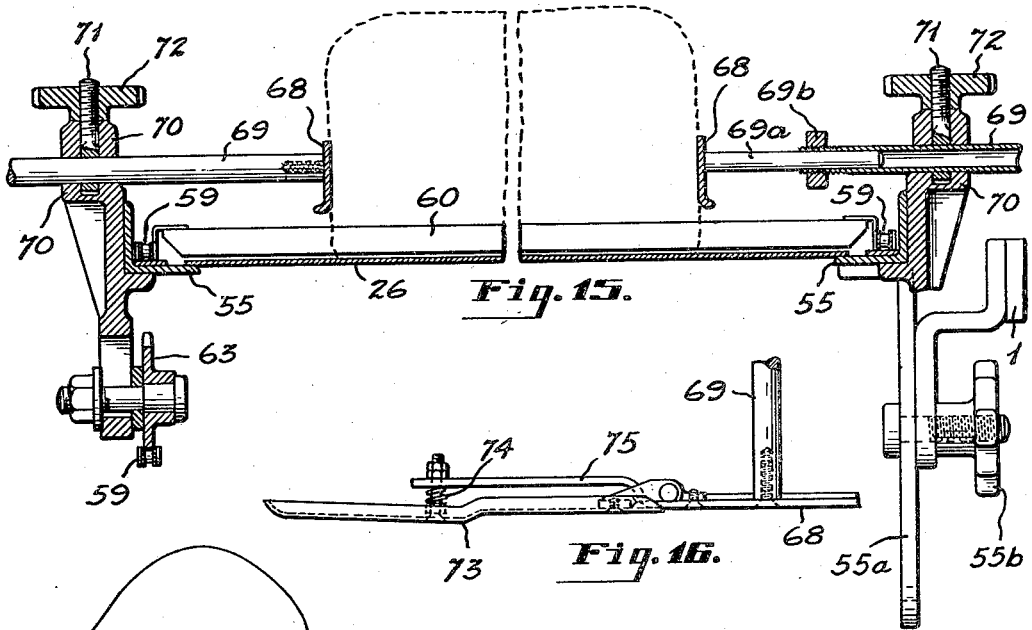
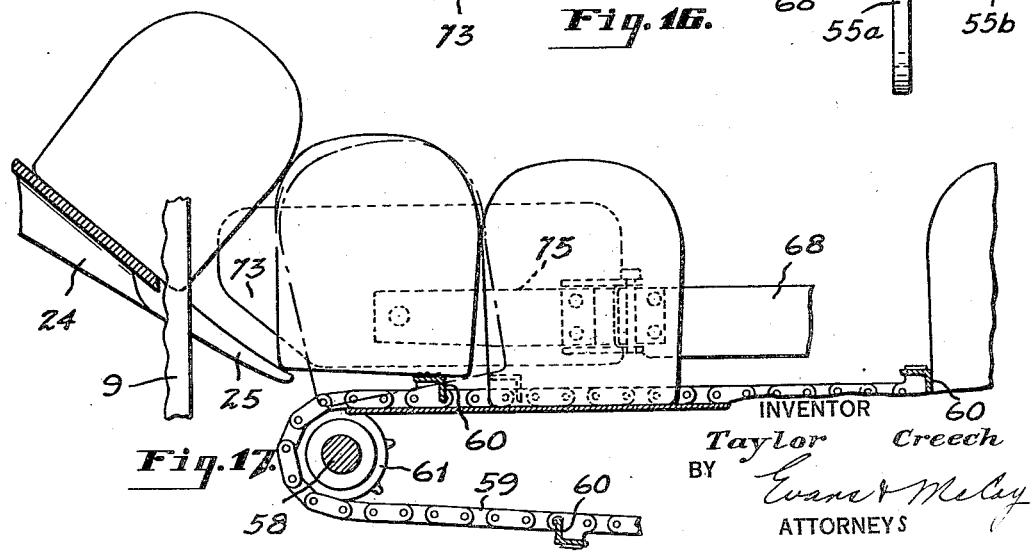
INVENTOR
Taylor Creech
BY
Evans & McCoy
ATTORNEYS Patented Sept. 29, 1936

2,056,134

UNITED STATES PATENT OFFICE 2,056,134

BREAD SLICING MACHINE

Taylor Creech, Davenport, Iowa, assignor, by mesne assignments, to First Trust and Savings Bank, Davenport, Iowa, trustee Application November 5, 1931, Serial No. 573,105

20 Claims. (Cl. 146—153)

This invention relates to bread slicing machines and more particularly to machines for completely slicing baked loaves of bread products in a single operation.

One of the objects of the present invention is to provide a slicing machine with new and improved means for synchronizing the operation of the same with a wrapping machine.

Another object is to provide a bread slicing machine having an operating connection with a wrapping machine with means for synchronizing the stopping of the bread discharging means relative to the wrapper so that the same will not stop with a loaf partially advanced into the wrapping machine.

Another object is to provide a bread slicing machine with improved feed and discharge conveyors of the endless type which are synchronously operated at different speeds and in which the feed conveyor can be bodily adjusted relative to the discharge conveyor, so as to compensate for bread loaves of different widths.

Another object is to provide a bread slicing machine with an endless feed conveyor and a feed table so arranged that a cushioning action is provided during the feeding of the bread to the cutter blades in order to avoid crushing tendency and to permit uniform slicing of the bread.

Another object is to provide a bread slicing machine with new and improved means for feeding the bread to the cutter blades at an angle in order that a corner of the loaf being sliced may be severed so as to prevent crushing and uneven slicing of the bread.

A further object is to provide a bread slicing machine with means adjacent the delivery end thereof for efficiently holding the slices in their original pre-sliced condition and for discharging the same in such condition onto the feed member of a wrapping machine.

With the above and other objects in view which will be apparent from the following detailed description, the present invention consists in certain features of construction and combinations of parts which will be readily understood by those skilled in the art to which the invention appertains.

In the drawings,

Figure 1 is a plan view of the slicing machine of the present invention showing the same mounted adjacent a diagrammatically illustrated wrapping machine;

Fig. 2 is a side elevation of the slicing machine, the elevated position of the discharge conveyor being shown in broken outline;

Fig. 12 is an enlarged fragmentary plan view of the feed conveyor;

Fig. 13 is a longitudinal section through the feed conveyor taken substantially on the line 13—13 of Fig. 12;

Fig. 14 is a transverse section taken substantially on the line 14—14 of Fig. 2;

Fig. 15 is a transverse section taken substantially on the line 15—15 of Fig. 2 showing the bread guiding means carried by the discharge conveyor;

Fig. 16 is an enlarged plan view showing the detailed construction of the bread receiving ends of the discharge guide bars; and Fig. 17 is a fragmentary view showing the manner in which the bread is discharged from the cutting blades onto the discharge conveyor between the pivoted side guides.

Figure 3:
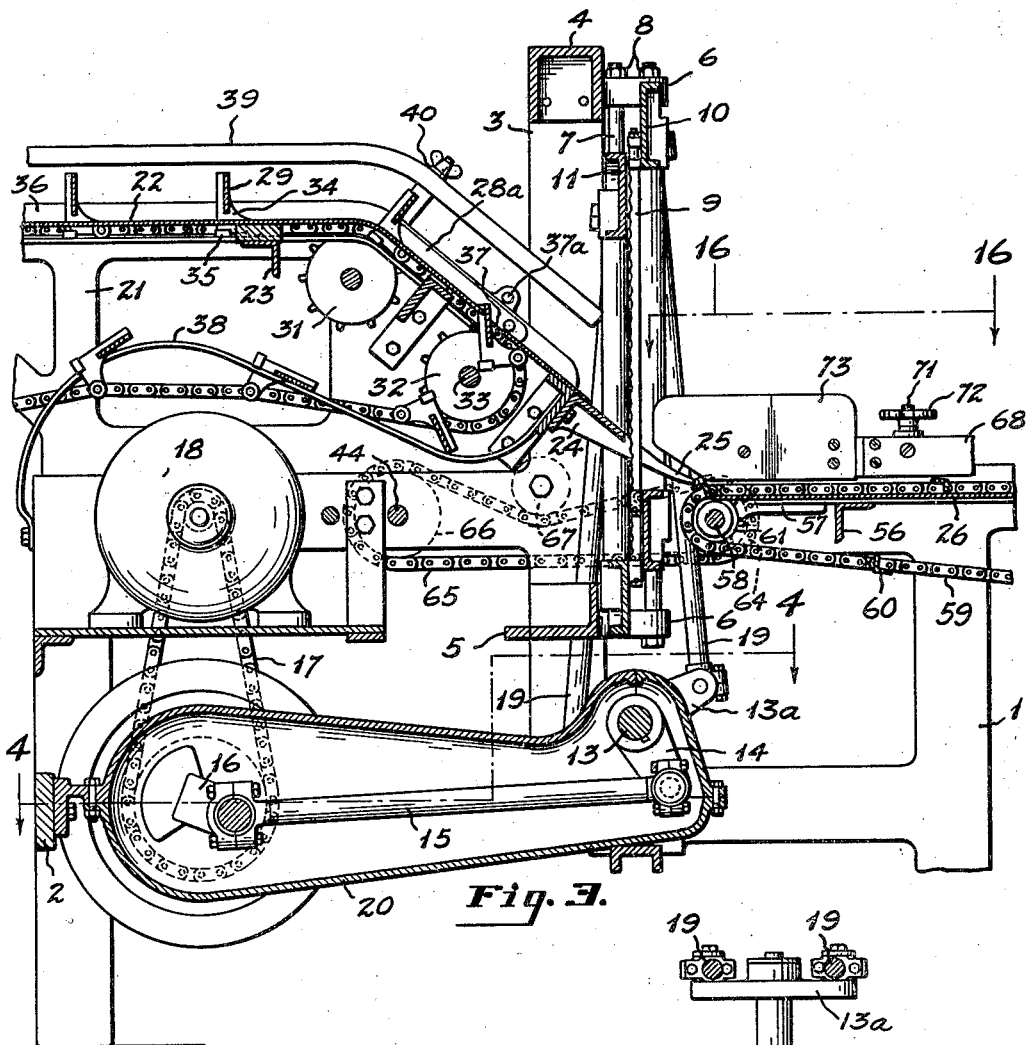
Fig. 3 is an enlarged side elevation of the central portion of the slicing machine, the side frame being removed to clearly show the means for operating the slicing mechanism.
Figure 4:
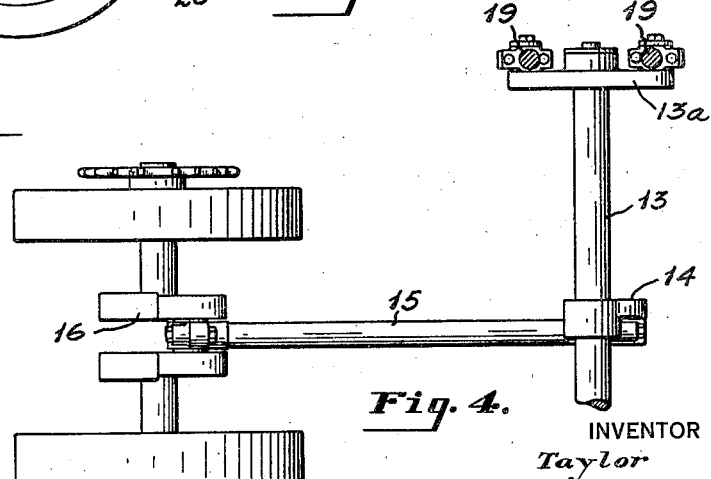
Fig. 4 is a section taken substantially on the line 4—4 of Fig. 3.
Figure 5:
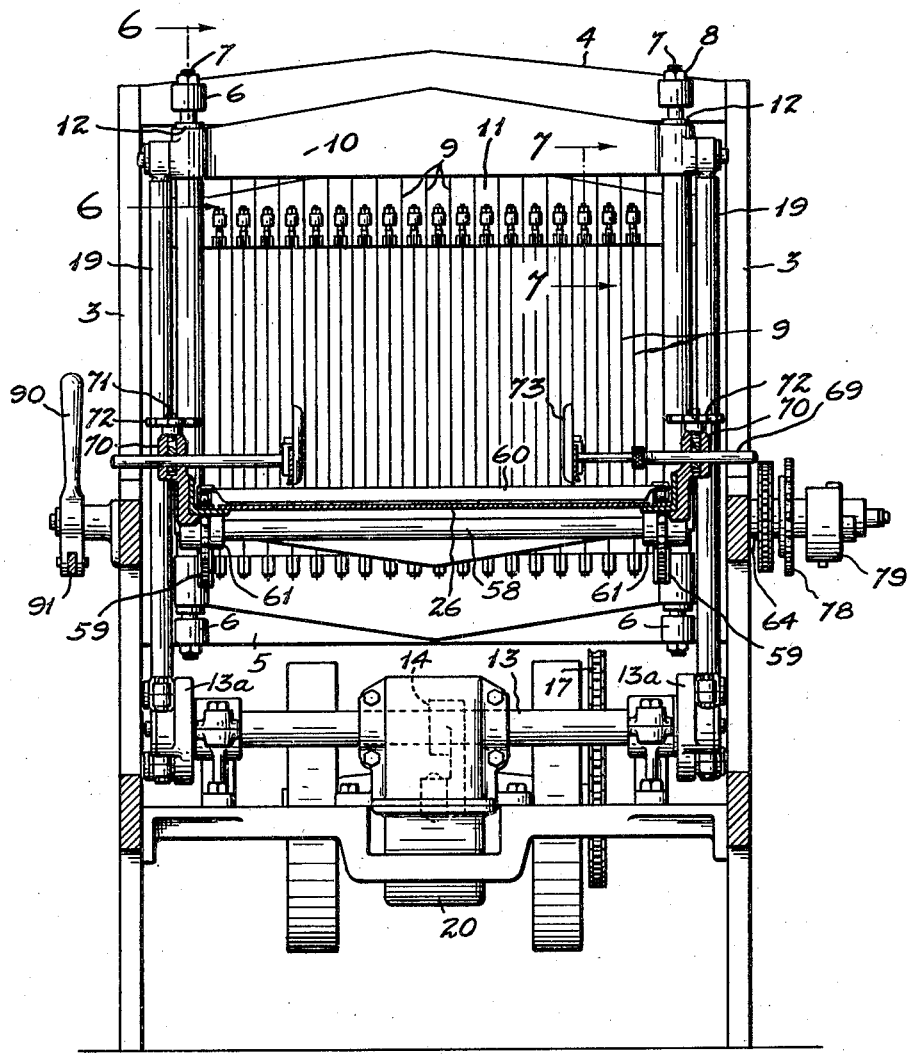
Fig. 5 is an enlarged section taken substantially on the line 5—5 of Fig. 2 showing the positions of the slicing blades.
Figure 6:
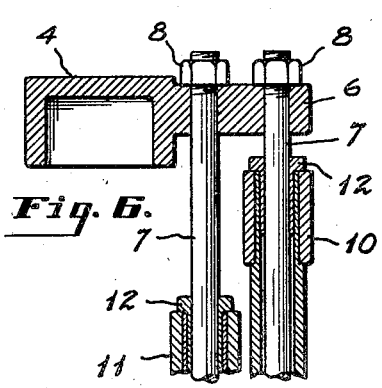
Fig. 6 is an enlarged section taken substantially on the line 6—6 of Fig. 5 showing the method of mounting the slicer blade frames for reciprocation.
Figure 7:
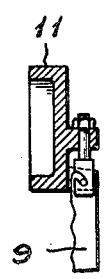
Fig. 7 is an enlarged section taken substantially on the line 7—7 of Fig. 5 showing the means for placing the slicer blades in tension.
Figure 8:
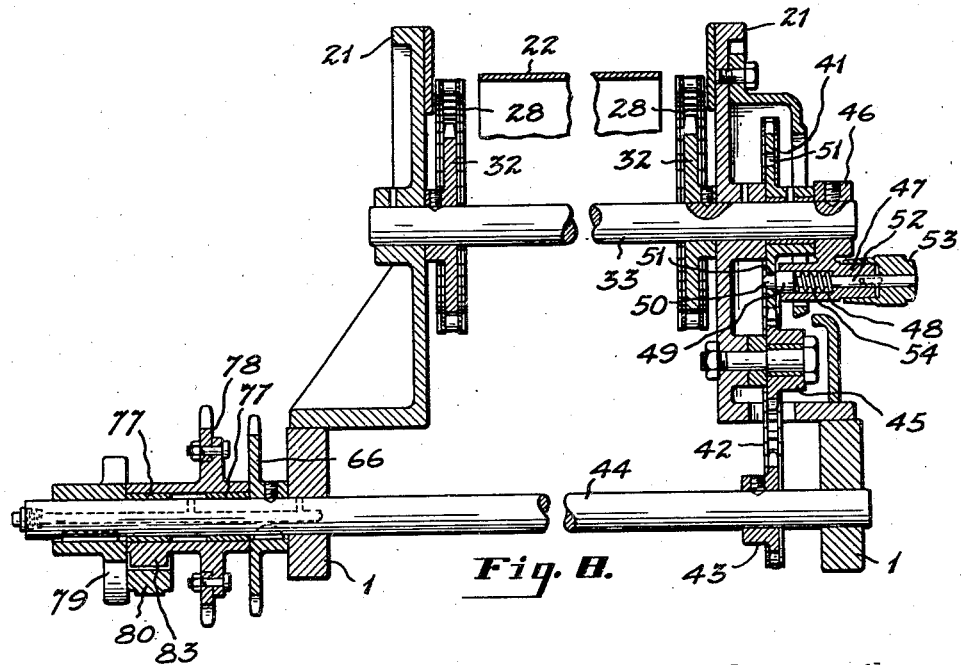
Fig. 8 is an enlarged section through the driving means for the feed conveyor taken substantially on the line 8—8 of Fig. 2.

Referring to the accompanying drawings in which like numerals refer to like parts throughout the several views, the slicing mechanism is carried by a pair of spaced side frames 1 interconnected by suitable cross members 2. Each side frame is provided with an upwardly extending portion 3 intermediate its ends which is connected by an upper bridge member 4 with the corresponding portion 3 on the other side frame. Below the upper rails of the side frames and in line with the bridge member 4 is a second bridge member 5 which extends between the side frames 1. The upper and lower bridge members 4 and 5 carry spaced forwardly extending lugs 6. A pair of guide bars 7 are provided at each side of the slicing machine inwardly of the side frames and which extend between the upper and lower lugs 6, as shown in Figs. 3 and 5. The guide bars 7 are securely mounted in the lugs 6 by means of nuts 8 threaded on their outer ends.

The slicing blades 9 are mounted in blade frames 10 and 11 which are provided with spaced upper and lower cross members and with spaced end members connecting the cross members. The blades 9 extend between the upper and lower cross members of the blade frame, and are placed in tension. The blades carried by one frame are positioned between and with their cutting edges in substantial alignment with the corresponding blades of the other frame, as shown in the drawings, so that the blades of both frames will initially engage the article to be sliced at substantially the same time.

The blade frames 10 and 11 are mounted for reciprocation in opposite directions, and the end members thereof are of hollow construction and provided with bushings 12 which surround the guide bars 7.

The mechanism for reciprocating the blade frames 10 and 11 comprises an oscillating shaft 13 mounted directly below the blade frames and which is provided with a crank arm 14 that is driven by a connecting rod 15 pivotally connected thereto. The connecting rod is driven from a crank shaft 16 carried by the side frames and which is driven by means of a link belt 17 from a suitable electric motor 18. The oscillating shaft 13 is provided at its ends with double-ended levers 13a to which suitable pitman rods 19 are pivotally connected. These pitman rods extend upwardly and are connected with the upper cross pieces of the two blade frames 10 and 11 so that when the shaft 13 is oscillated through the rotation of the crank shaft 16 the pitman rods 19 will cause the blade frames 10 and 11 to reciprocate in opposite directions. A portion of the oscillating shaft 13 and the shaft 16 and the driving mechanism for the shaft 13 is enclosed within a suitable crank case 20 which may carry an adequate supply of oil for lubricating the bearing surfaces, and in which the crank shaft 16 may rotate.

The present invention is not directed specifically to the slicing mechanism per se, but is directed to the means for feeding the baked articles to and conveying the same away from the slicing blades, the mechanism for picking up the sliced article as it is discharged from the blades and the mechanism driving the feed and discharge conveyors, which mechanism is in turn driven by the driving mechanism of a suitable wrapping machine such as that illustrated in Fig. 1. The article to be sliced is fed to the slicing mechanism by means of a suitable endless conveyor which is carried by sub-frame members 21 that are secured to the side frames 1. The endless feed conveyor is of the flight type and moves the bread to be sliced along a feed table 22. This feed table is horizontally arranged between the sub-frame members 21 for a portion of its length, and is then inclined downwardly to a point adjacent the cutting edges of the slicing blades 9. This feed table 22 is supported on and rigidly secured to angle-shaped cross pieces 23 that extend between the sub-frame members 21. The feed table 22 is secured to the cross pieces 23 through the medium of block supports 23a which are of lesser width than the feed table, to support the same above the cross pieces 23 for a purpose to be later described.

The bread, after it moves through the slicing blades, is supported on a guide or grid plate 24 arranged at substantially the same angle as the inclined portion of the feed table 22 and secured to the feed cross piece 23. This guide or grid plate is formed with a plurality of finger portions 25 which extend between the slicing blades 9 and curve forwardly and upwardly slightly away from the inclined plane of the guide 24. The finger portions 25, thus forming a grid through which the slicing blades may reciprocate, terminate in spaced relation slightly above a discharge table 26.

The feed conveyor, as previously mentioned, is of the flight type and comprises a pair of endless side chains 28 having a plurality of uniformly spaced flights 29 extending therebetween. The flights 29 are pivotally secured to the inner sides of the conveyor chains 28, as shown in Figs. 3 and 14, so that they may be tilted after their bread-feeding operation. The side chains are carried by three pairs of sprockets 30, 31, and 32. The sprockets 30 are mounted as shown in Fig. 13 to the rear end of the sub-frame members 21, the sprockets 31 are mounted on the sub-frame members substantially at the end where the horizontal portion of the feed table 22 merges into its inclined portions, and the sprockets 32 are mounted intermediate the ends of the inclined portion of the feed table, as shown in Fig. 3. The sprockets 32 are driven from a drive shaft 33 that is journaled in the sub-frame members 21.

Each flight comprises a pair of angle-shaped brackets 34 which are pivoted directly to the side chains 28 and lie outwardly of the marginal edges of the feed table 22, as shown in Fig. 14. The flights are connected by flat strap portions which, when they are in their feeding position, are spaced slightly above the feed table 22. Each flight is further provided with an inwardly extending lug 35 that is arranged during the feeding portion of the flight movement to ride upon the horizontal portions of angle bars 36 secured to the sub-frame, the horizontal portions of which are disposed below the feed table 22.

The inclined portion of the feed table is separated intermediate its ends to provide a slot 37 through which the flights 29 pass and disappear during the operation of the feed conveyor.

During the operation of the feed conveyor the strap-like portions of the flights are disposed in a vertical position, the same being held in this position by means of the contact between the lugs 35 and the horizontal portion of the angle bars 36, and move the loaves of bread forwardly along the feed table 22. As the chain links which carry the flights pass around the feed chain sprockets 32 the lugs 35 of the flight brackets 34 disengage from the angle members 36 adjacent the transverse opening 37 and the flights then gradually drop down through the transverse slot 37, as shown in Fig. 3, since they are pivoted to the side chains 28. Positive movement of the flights through the slot 37 is provided by stop pins 37a formed on the frame members 21 to engage the flights 29. The flights during their return movement engage with a pair of curved guide straps 38 which pivot the flights so that they will be suspended in a downward direction from the side chains 28. As each flight approaches the rearward sprockets 30 the lugs 35 thereof again engage the rear ends of the horizontal portions of the angle members 36 which are curved over the shaft that supports the rear sprockets 30 in order that the curved portions thereof will gradually move the flights back to their vertical pushing position. The conveyor side chains 28 are also guided during their movement over the inclined portion of the feed table by means of guide straps 28a secured to the frame members 21.

The loaves of bread are centered on the feed table 22 by means of side guides 39 that extend substantially the entire length of the feed table 22. These side guides 39 are preferably of resilient material and converge toward the forward end of the conveyor, as shown in Fig. 12, and then terminate in parallel portions that extend downwardly at substantially the same angle as the inclined portion of the feed table. These inclined portions extend substantially to the cutting blades 9, as shown in Fig. 3, so that they will guide the loaves of bread substantially to the point where the bread is first severed by the blades. The forward ends of the guides 39 are so arranged that they may be moved toward and away from each other by means of adjustable brackets 40 so that they can be adjusted to different lengths of bread.

The drive shaft 33 is driven by means of a sprocket 41 that is rotatably mounted thereon. This sprocket is driven through the medium of a drive chain 42 from a sprocket 43 and is securely mounted to a main conveyor drive shaft 44, a suitable adjustably mounted idler sprocket 45 being provided to compensate for slack in the drive chain 42. The end of the shaft 33 adjacent the sprocket 41 is provided with a collar 46 rigidly secured thereto, and which is provided with an axial portion 47. This axial portion is arranged radially outwardly of the hub of the sprocket 41 and is formed with a central opening 48 which receives a locking pin 49, the locking pin 49 being provided with a box portion 50 that is arranged to extend through any one of a number of transverse openings 51 provided in the sprocket 41 for a purpose to be later described. The locking pin 49 is formed with a shank 52 which extends axially through the portion 47 and is provided with a handle member 53 at its outer end, a coil spring 54 being provided around the shank 52 to engage with the locking pin 49 and the bottom of the opening 48 to hold the pin in locking engagement with the sprocket 41. By pulling outwardly on the handle member 53 the box 50 of the locking pin can be disengaged from the sprocket 41 with the result that the shaft 33 can be rotated and the boss 51 engaged with one of the openings 51 formed in the sprocket 41.

The discharge mechanism for the slicing machine comprises the previously mentioned discharge table 26 which is mounted upon a pair of spaced angle shaped side rails 55 which are interconnected by angle-shaped cross pieces 56. The discharge table 26 is provided at its rearward end with rearwardly extending brackets 57 which carry a rotatable shaft 58 that is journaled in the side frames 1 in such a manner that the discharge table 26 may be swung upwardly about the shaft 58 as an axis to adjust the height of the forward end of the discharge table to any desired position.

The side rails 55 are formed with downwardly extending slotted brackets 55a which engage with portions of the side frames 1 and are provided with an adjusting screw member 55b so that the discharge mechanism can be set in any desired position by tightening the screw member 55b.

The bread as it moves through the slicing blades is moved along the discharge table by means of an endless conveyor of the flight type, which comprises a pair of spaced side chains 59 that are interconnected by transversely extending flights 60. These flights 60 are rigidly secured to the side chains 59 and are of angle shaped construction, the vertical legs thereof forming the means for moving the bread along the discharge table 26. The side chains pass over sprockets 61 mounted on the shaft 58 and over sprockets 62 provided at the forward ends of the side rails 55, suitable idler sprockets 63 being provided to compensate for slack in the side chains 59. The discharge conveyor is driven by means of a sprocket 64 mounted on the shaft 58 through the medium of a drive chain 65 which is driven by a sprocket 66 that is rigidly secured to the main conveyor drive shaft 44, an idler sprocket 67 being provided to take up slack in the drive chain 65. The discharge conveyor just described is arranged to be driven at a greater speed than the feeding conveyor in order to quickly move the sliced bread away from the cutting blades and away from the succeeding loaves that are being sliced. Because of this increased speed the flights 60 are arranged greater distances apart than the flights 29 of the feed conveyor and function to assist in moving the sliced loaves of bread onto the discharge table 26.

The bread as it is sliced is guided on the discharge table 26 by means of side guides 68 adjustably carried by the side rails 55. These side guides are provided with outwardly extending rod portions 69 that extend through brackets 70 secured to the side rails 55. The brackets 70 are provided with eye bolts 71 having rotatable hand wheels 72 thereon. By rotating the hand wheels 72 the eye bolts 71 can be clamped around the outwardly extending rod portions 69 to set the side guides 68 in any desired position.

The rearward ends of the side guides 68 are provided with an improved means for assisting the discharge of bread from the cutter blades onto the discharge table 26. This means comprises a rearwardly extending plate 73 hinged to each of the side guides 68. This plate is of substantially greater width than the side guide and is held inwardly by means of a coil spring 74 that abuts against the same and against a bracket portion 75 formed at the rear end of the side guides 68. These plates are rounded off at their outer ends and are positioned adjacent the cutting blades 9 as shown in Fig. 3. A positive tension is always maintained against the plates 73 by the springs 74 so that these plates will hold the heels of the bread loaf on the loaf in proper position. These plates 73 engage with the sliced loaf immediately as it leaves the cutting blades and exerts endwise pressure on the loaf, tending to hold the slices in their contiguous pre-sliced condition. These pivoted side plates further assist the action of the flights on the discharge conveyor.

The bread is fed through the cutting blades on an incline and after passing therethrough its direction is changed so that it will travel horizontally. The lower portion of the bread in making this change in movement moves through a greater arc than the upper portion. In order to accomplish this without crushing at the top portion by reason of the pressure exerted by the following loaves, the flights of the discharge conveyor are utilized to propel the lower portion of the loaf at a high rate of speed. Specifically the bread, as shown in Fig. 17, as it is sliced moves downwardly on the guide portion 24 in an angular position between the side plates 73 and projects over the edge of the fingers 25. The flight 60 on the discharge conveyor strikes the projecting portion of the loaf and has a tendency to move the same off from the finger portions 25 between the side plates 73 and tilt the loaf to the position shown in dotted outline in Fig. 17, this flight then moving out from underneath the loaf so that the loaf will be in position on the discharge table to be moved forward by the next succeeding flight 60. In other words, the flight on the discharge conveyor comes up underneath the loaf so as to straighten the loaf and position the same on the discharge conveyor in position in front of the next succeeding flight. The side plates 73 press the ends of the sliced loaf together with a greater pressure while the flight is tilting the loaf and moving it to its proper position on the discharge table than they do when the loaf is moved farther along the discharge table by the following flight. This keeps the sliced loaf of bread from rolling between the side guides. Furthermore, the pivoted side plates 73 which are under tension compensate for loaves which vary slightly in length. One or both side guides 68 may be further adjustable, if desired, by forming the rod 69 to a tubular shape and then providing a secondary rod 69a which telescopes with the rod 69 and which may be clamped to any position relative to the rod 69 by means of a nut 69b threaded on the rod 69.

The projecting fingers 25 of the loaf guide 24 are curved in such a manner that the loaf will slide through the reciprocating blades without the use of a positive pusher. These fingers are also so arranged that the loaf will project therefrom in such a manner that the forward edge will be moved upwardly by the discharge conveyor flight 60.

The main drive shaft 44 for the feed and discharge conveyors is arranged to be driven directly by a wrapping machine such as the machine H shown in Fig. 1. The driving connection between the drive shaft 44 and the wrapping machine embodies a clutch arrangement which synchronizes the operation of the discharge conveyor with the feed conveyor 76 of the wrapping machine in such a manner that the discharge conveyor will always place the endmost loaf of bread completely on the wrapping machine conveyor 76 in position to be transferred to the wrapping mechanism. In other words, the discharge conveyor of the slicing machine will always stop with its flights in a predetermined position which prevents the partial disposition of the bread loaves on the wrapping machine feeding means, and therefore eliminates the tendency toward crushing of the loaves by improper transfer to the wrapping machine during starting and stopping of the respective machines.

The driving connection for the main conveyor drive shaft 44 embodies a pair of spaced sleeves 77 mounted on one end of the shaft 44, a sprocket wheel 78 rotatably mounted on the sleeves 77, and an end plate 79 rigidly secured to the outer end of the shaft 44 and which carries a portion of the clutch mechanism. The end plate 79 carries a pawl 80 pivoted thereto by means of a pin 81 and which is urged toward the shaft 44 by means of a tension spring 82.

The hub of the sprocket wheel is formed with a radial boss 83 which is formed with a single pawl engaging surface 84. During normal operation the pawl 80 engages with the surface 84 of the boss 83 which establishes a driving connection to cause the shaft 44 to be driven from the sprocket wheel 78 through the spring wheel pawl 80 and boss 83.

The sprocket wheel 78 is positively driven by a link chain 85 or other driving means from the drive shaft 86 of the wrapping machine, as shown in Fig. 1.

The discharge conveyor, as previously described, is so arranged that the flights will stop at a definite position to prevent a partial delivery of the bread onto the feeding means of the wrapping machine. A conveyor control lever 87 is mounted on a shaft 88a extending between the side frames 1 adjacent the conveyor drive shaft 44. The shaft 88a is provided with a boss 88 extending downwardly below the pivot axis and when it is desired to stop the operation of the discharge conveyor and incidentally the feed conveyor, the control lever 87 is thrown to the right as viewed in Fig. 9. This moves the boss 88 to the left in the path of a projecting finger 89 formed on the pawl 80. The finger 89 engages with the boss 88 which causes the pawl 80 to be disengaged from the radial boss 83 of the sprocket wheel 78, as shown in Fig. 10, and stops the rotation of the main conveyor drive shaft 44 while permitting the sprocket wheel 78 to be freely rotated by the wrapping machine. This stops the discharge conveyor with the flights thereof in a predetermined position so that it will be impossible for the discharge conveyor to position a sliced loaf of bread in such a manner that the loaf will have a portion lying on the discharge conveyor and another portion on the feed conveyor of the wrapping machine.

Figure 9:
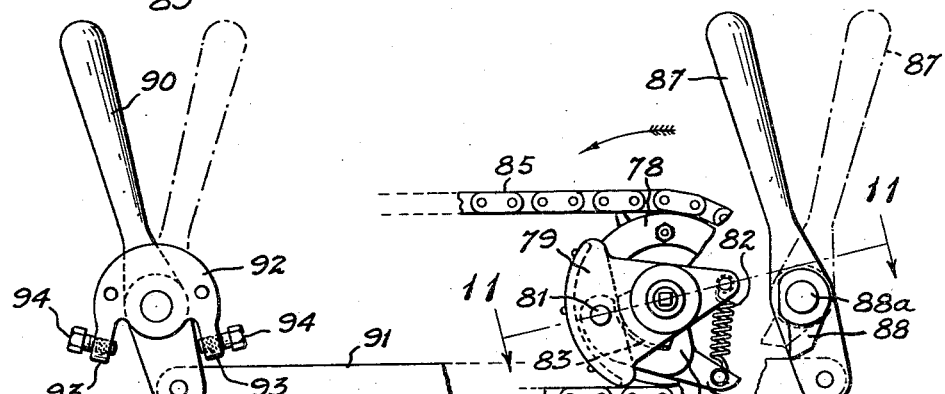
Fig. 9 is a view showing the clutch arrangement and the mechanism for operating the same that connects the discharge conveyor for operation by the driving mechanism of a slicing machine.
Figure 11:
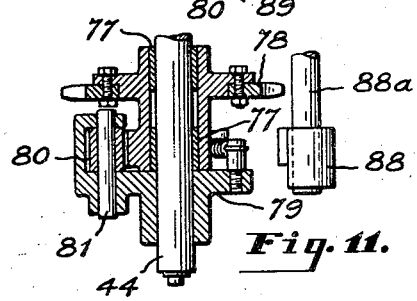
Fig. 11 is a section taken substantially on the line 11—11 of Fig. 9.
Figure 10:
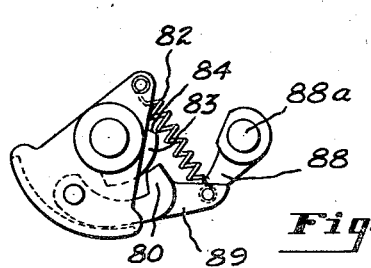
Fig. 10 is a view similar to Fig. 9 showing the position of the clutch mechanism when the driving connection is released.

When it is desired to place the discharge conveyor in operation the control lever 87 is merely thrown to the left as viewed in Fig. 9, which releases the engagement of the boss 88 and finger 89 of the pawl 80, thereby permitting the spring 82 to move the pawl inwardly so that it will engage the surface 84 at the proper time.

In order that the operator of the machine may control the starting and stopping of the conveyors at a point near the feed conveyor, a tandem control arrangement is provided. This comprises a second control lever 90 pivoted to the side frame adjacent the feed conveyor and which is connected with the control lever 87 by means of a connecting ring 91. The degree of movement of the control levers 87 and 90 is limited in both directions by means of a bracket 92 having spaced depending lugs 93 which are provided with cap screws 94 extending therethrough to engage with the control levers 90.

As previously mentioned, the flights of the discharge conveyor are preferably disposed greater distances apart than the flights of the feed conveyor, and the discharge conveyor is driven at a higher speed than the feed conveyor. Furthermore, the feed and discharge conveyors are in synchronism with each other so that the flights bear a definite relation to each other during operation. These conveyors are set to operate with loaves of bread having a certain definite width. When it is desired to slice bread of greater or less width, it is then necessary to slightly change the relationship of the flights of the feed and discharge conveyors. This is accomplished by disengaging the locking pin 49 from the sprocket 41 and then rotating the shaft 33 by means of the axial portion 47 and re-engage the locking pin 49 with a different opening 51 that is formed in the sprocket 41. This permits a bodily movement of the endless feed conveyor with respect to the discharge conveyor so that the flights thereof can be retarded or advanced relative to the flights of the discharge conveyor. By adjusting the conveyors in this manner, it is therefore possible to insure that the flights of the discharge conveyor will engage with the sliced bread at substantially the same point so that the proper movement of the sliced loaves to the horizontal position on the discharge table 26 can be obtained.

The advantages of the slicing machine construction shown in the drawings and described are readily apparent. The apparatus is so arranged that the same can be synchronized for operation with a wrapping machine in such a manner that the conveyors cannot be stopped with the loaves partially on the wrapping machine, with the result that crushing of the loaves is prevented. Furthermore, the discharge and feed conveyors can be adjusted relative to each other, although their speeds are constant, in order to compensate for loaves of bread of different widths. The construction is so arranged that crushing of the bread is prevented during the slicing operation since the loaves are fed for a portion of their travel to the slicing machine by gravity and may in themselves act as cushioning means.

Furthermore, the loaves are fed to the cutting blades at an angle in order that a corner may first be severed. This also tends toward the elimination of crushing of the bread. It is to be noted that as the loaf moves past the cutting blades, it passes between the side guides over the discharge table and is slightly compressed therebetween while in an angular position. The bread then moves in this position into engagement with the discharge conveyor which suddenly engages the corner of the loaf and actually tilts the same upwardly so that the loaf moves into a horizontal position ready to be propelled forwardly by the discharge conveyor.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. In a bread slicing machine, slicing means, an endless discharge conveyor having a plurality of flights thereon for conveying sliced loaves of bread away from said slicing means, means for driving said conveyor and having a releasable connection therewith whereby the driving means may operate independently of said conveyor, means for breaking said connection with the flights of said conveyor at a predetermined location, and means for making said connection at only a single predetermined position of said driving means relative to said conveyor.

2. In a bread slicing machine, slicing means, an endless discharge conveyor having a plurality of flights thereon for conveying sliced loaves of bread away from said slicing means, a rotatable shaft for driving said conveyor, a drive member rotatably mounted on said shaft, a clutch means for placing said drive member into and out of driving connection with said shaft, said clutch means being arranged to effect said driving connection at only a single predetermined position of said driving means relative to said conveyor and means cooperating with said clutch device for stopping said conveyor with the flights thereof in a predetermined location.

3. In a bread slicing machine, slicing means, an endless feed conveyor having flights thereon to convey unsliced bread to said slicing means, an endless discharge conveyor having flights thereon to convey sliced loaves of bread away from said slicing means, the flights of said discharge conveyor being spaced farther apart than the flights of said feed conveyor, a drive shaft for said feed conveyor having a drive member rotatably mounted thereon, means on said drive shaft for effecting a driving connection therebetween and for breaking said driving connection to rotate said shaft and retard or advance the flights of said feed conveyor relative to the flights of said discharge conveyor, a drive shaft for said discharge conveyor also having a drive member, and a single means for driving both said drive shafts to synchronously operate said feed and discharge conveyors.

4. In a bread slicing machine, slicing means, an endless feed conveyor having flights thereon to convey unsliced bread to said slicing means, an endless discharge conveyor having flights thereon to convey sliced loaves of bread away from said slicing means, the flights of said discharge conveyor being spaced farther apart than the flights of said feed conveyor, means for driving said feed and discharge conveyors for synchronous operation, and means for advancing or retarding the flights of said feed conveyor relative to the flights of said discharge conveyor, said means including a drive shaft for said feed conveyor, a drive element rotatably mounted on said drive shaft, an arm fixed to said drive shaft for rotating the same to advance or retard the said flights of said feed conveyor, and locking means carried by said arm for connecting said arm with said drive element at any one of a plurality of positions.

5. In a bread slicing machine having a plurality of cutting blades, a discharge table adjacent said blades, and spaced bread guiding means mounted above said table, each of said means including a relatively long side rail having its inner end spaced from said blades and a relatively wide plate pivoted to said inner end and extending substantially to said blades, said plate being resiliently urged toward the other plate.

6. In a bread slicing machine having a plurality of spaced cutter blades, a feed table at one side thereof and inclined downwardly toward said blades and having finger portions extending between said blades, a discharge table positioned adjacent to and at the other side of said blades slightly below the ends of said finger portions, and means for disposing the sliced loaves of bread onto said discharge table comprising a plurality of transversely extending conveyor flights movable over said discharge table, said flights being disposed to engage and move the loaves carried by said finger portions to a horizontal position on said discharge table in position to be propelled forwardly thereon by the following flight.

7. In a bread slicing machine having a plurality of spaced cutter blades, a feed table at one side of and inclined downwardly toward said blades and having guide fingers extending between said blades, a discharge table positioned adjacent to and at the other side of said blades slightly below the projecting ends of said fingers, and a discharge conveyor having transverse flights movable over said discharge table timed with the bread being sliced by said blades in order that said flights may engage a lower portion of the bread loaves and tilt the same upwardly into a horizontal position on said discharge table to be propelled forwardly on said table by the succeeding flights.

8. In a bread slicing machine having a plurality of spaced cutter blades, a feed table at one side of and inclined downwardly toward said blades and having guide fingers extending between said blades, a discharge table positioned adjacent to and at the other side of said blades slightly below the projecting ends of said fingers, a discharge conveyor having transverse flights movable over said discharge table timed with the bread being sliced by said blades in order that said flights may engage a lower portion of the bread loaves and tilt the same upwardly into a horizontal position on said discharge table to be propelled forwardly on said table by the succeeding flights, and a pair of spaced side guides extending longitudinally of said discharge table for holding the loaves against endwise movement during engagement by said flights.

9. In a bread slicing machine having a plurality of spaced cutter blades, a feed table at one side of and inclined downwardly toward said blades and having guide fingers extending between said blades, a discharge table positioned adjacent to and at the other side of said blades slightly below the projecting ends of said fingers, a discharge conveyor having transverse flights movable over said discharge table in order that said flights may engage a lower portion of the bread loaves and tilt the same upwardly into a horizontal position on said discharge table to be propelled forwardly on said table by the succeeding flights, and a pair of spaced side guides extending longitudinally of said discharge table for holding the loaves against endwise movement during engagement by said flights said guides including resiliently mounted plates pivoted thereto adjacent said cutter blades.

10. In a bread slicing machine having a plurality of spaced cutters, a bread support adjacent said cutters, a feed table spaced from said support, endless side members adjacent the sides of said table, means for actuating said endless members, and a plurality of flights extending between said endless members and arranged to move over said feed table and feed loaves of bread toward said spaced cutters, said flights being pivoted in advance of their planes to said side members, guide means for holding said flights in their feed position, said guide means extending substantially to the space between said bread support and said feed table whereby said flights upon clearing said guide means may pass downwardly at substantially the end of their feeding movement through the space between said bread support and feed table to avoid crushing of the corners of the loaves of bread being fed thereby.

11. In a bread slicing machine having a plurality of spaced cutters, a bread support adjacent said cutters, a feed table spaced from said support, endless side members adjacent the sides of said table, means for actuating said endless members, a plurality of flights extending between said endless members and arranged to move over said feed table and feed loaves of bread toward said spaced cutters, said flights being pivoted in advance of their planes to said side members, guide means for holding said flights in their feed position, said guide means extending substantially to the space between said bread support and said feed table whereby said flights upon clearing said guide means may pass downwardly at substantially the end of their feeding movement through the space between said bread support and feed table to avoid crushing of the corners of the loaves of bread being fed thereby, and guides means extending to the space between said feed table and bread support for holding said flights in feeding position.

12. In a bread slicing machine having a plurality of spaced cutters, a bread support adjacent said cutters, a feed table spaced from said support, endless side members adjacent the sides of said table, means for actuating said endless members, and a plurality of flights extending between said endless members and arranged to move over said feed table and feed loaves of bread toward said spaced cutters, said flights being pivoted in advance of their planes to said side members, guide means for holding said flights in their feed position, said guide means extending substantially to the space between said bread support and said feed table whereby said flights upon clearing said guide means may pass downwardly at substantially the end of their feeding movement through the space between said bread support and feed table to avoid crushing of the corners of the loaves of bread being fed thereby, said bread support and the adjacent portion at least of said feed table being inclined relative to said cutters.

13. In a bread slicing machine having a plurality of spaced cutters, a bread support adjacent to said cutters, a feed table spaced from said support, endless side members adjacent the sides of said table and overlapping with said bread support, rotary means for supporting and actuating said side members, a plurality of flights extending between said endless side members for feeding loaves of bread toward said cutters, a plurality of arms pivoted to said side members at one end and being secured to said flights rearwardly of their point of pivotal connection to said side members, and side guides extending parallel to said feed table up to the space between said bread support and feed table for guiding said arms during the feeding movement of said flights, whereby said flights, when they approach the end of their feeding movement and clear said side guides, may quickly drop by gravity through said space between the bread support and feed table to avoid crushing of the corners of the loaves of bread being fed thereby.

14. In a bread slicing machine having a plurality of spaced cutters, a bread support adjacent said cutters, a feed table spaced from said support, endless side members adjacent the sides of said table, means for actuating said endless members, a plurality of flights extending between said endless members and arranged to move over said feed table and feed loaves of bread toward said spaced cutters, said flights being pivoted in advance of their planes to said side members, guide means for holding said flights in their feeding position, said guide means extending substantially to the space between said member support and said feed table whereby said flights upon clearing said guide means may pass downwardly at substantially the end of their feeding movement through the space between said bread support and feed table to avoid crushing of the corners of the loaves of bread being fed thereby, and means for moving said flights back to their proper feeding positions.

15. In a bread slicing machine, a slicing means, an endless feed conveyor having flights thereon to convey unsliced bread to said slicing means, an endless discharge conveyor having flights thereon to convey sliced loaves of bread away from said slicing means, the flights of said discharge conveyor being spaced farther apart than the flights of said feed conveyor, a drive shaft for said feed conveyor having a drive member rotatably mounted thereon, a collar secured on said drive shaft, means for effecting a driving connection between said collar and member at various angular relationships, a drive shaft for said discharge conveyor also having a drive member, sprocket means connecting said drive members, and means for positively driving said last named drive shaft to synchronously operate said feed and discharge conveyors.

16. In a bread slicing machine having a plurality of cutting blades, a bread supporting means adjacent said blades, spaced bread guides mounted above said bread supporting means and disposed at one side of said blades, said guides including a pair of relatively long side rails having their inner ends terminating a substantial distance from said blades, and plates pivoted to said inner ends of the side rails and extending toward the blades, said plates being resiliently urged toward each other.

17. A baked-loaf slicing machine comprising, in combination, a grid plate, series of slicing blades disposed for reciprocation transversely of and through the grid plate, a feed plate disposed in operative alignment with the grid plate to one side of the cutting plane of the blades, a delivery plate disposed in operative alignment with the grid plate upon the opposite side of the cutting plane of the blades, a first connected series of spaced members disposed for travel over the feed plate for feeding the loaves in an abutting series through the blades, a second connected series of members for conveying the sliced loaves over the delivery plate, the second members being more widely spaced than the first members, and a driving connection between said series of members for effecting synchronized travel thereof, said connection including indexing means for setting the first series with respect to the second series for compensating for differences in loaf dimensions.

18. A baked-loaf slicing machine comprising, in combination, a grid plate, series of slicing blades disposed for reciprocation transversely of and through the grid plate, a feed plate disposed in operative alignment with the grid plate to one side of the cutting plane of the blades, a delivery plate disposed in operative alignment with the grid plate upon the opposite side of the cutting plane of the blades, a first connected series of spaced members disposed for travel over the feed plate for feeding the loaves in an abutting series through the blades, a second connected series of members more widely spaced than the first series of members for conveying the sliced loaves over the delivery plate, and a driving connection between said series of members for effecting synchronized travel thereof, said connection including a drive shaft, a driven shaft, sprockets on said shafts, chains engaging the sprockets, and indexing means for varying the angular relationship between said shafts for adjustably setting the first series of members relatively to the second series of members for compensating for differences in loaf dimensions.

19. A baked-loaf slicing machine comprising, in combination, a grid plate, series of slicing blades disposed for reciprocation transversely of and through the grid plate, a feed plate disposed in operative alignment with the grid plate to one side of the cutting plane of the blades, a delivery plate disposed in operative alignment with the grid plate upon the opposite side of the cutting plane of the blades, a connected series of spaced members disposed for travel over the feed plate for feeding the loaves in an abutting series through the blades, a connected series of members more widely spaced than the feeding members for conveying the sliced loaves over the delivery plate, and mechanism for synchronizing movement of the feeding members with movement of the conveying members for depositing the respective sliced loaves to and between successive pairs of the conveying members, said synchronizing mechanism comprising first and second rotary shafts relatively adjustable for varying the angular relationship therebetween, sprockets on said shafts, and chains engaging such sprockets.

20. In a baked-loaf slicing machine, in combination, a grid plate, a series of slicing blades disposed for reciprocation transversely to and through the plate, a receiving plate disposed in operative alignment with the grid plate to one side of the cutting plane of the blades, mechanism for delivering the sliced loaves from the blades to the delivery table, guides for directing movement of the loaves in their travel, said guides having pivoted inwardly biased wings adjacent the blades for engaging the successively sliced loaves as they leave the blades for restoring the sliced loaves to pre-sliced dimensions.

TAYLOR CREECH.